(12) United States Patent
Hinson

(10) Patent No.: US 7,503,452 B2
(45) Date of Patent: Mar. 17, 2009

(54) RETURN ROLLER ASSEMBLY

(76) Inventor: Michael D. Hinson, 119 Gable Way, Madera, CA (US) 93637

( * ) Notice: Subject to any disclaimer, the term of this patent is extended or adjusted under 35 U.S.C. 154(b) by 0 days.

(21) Appl. No.: 11/450,007

(22) Filed: Jun. 8, 2006

(65) Prior Publication Data

US 2007/0284227 A1    Dec. 13, 2007

(51) Int. Cl.
*B65G 15/08* (2006.01)
(52) U.S. Cl. .................. 198/824; 198/818; 198/823; 198/842
(58) Field of Classification Search .......... 198/818, 198/820–828, 842; 384/477
See application file for complete search history.

(56) References Cited

U.S. PATENT DOCUMENTS

| | | | |
|---|---|---|---|
| 1,107,882 A * | 8/1914 | Bickhart | 198/842 |
| 3,105,588 A | 10/1963 | Long | |
| 3,199,661 A | 8/1965 | Smith | |
| 3,212,626 A | 10/1965 | McLeish et al. | |
| 3,545,602 A | 12/1970 | McCullagh | |
| 4,029,200 A | 6/1977 | Dillon | |
| 4,032,002 A | 6/1977 | Jackson | |
| 4,234,110 A * | 11/1980 | Zaehringer | 223/57 |
| 4,266,662 A | 5/1981 | Reid | |
| 4,643,300 A * | 2/1987 | Morrison | 198/842 |
| 4,830,179 A | 5/1989 | Fyfe | |
| 4,903,820 A | 2/1990 | Fyfe | |
| 4,936,443 A * | 6/1990 | East | 198/827 |
| 5,373,935 A | 12/1994 | Anderson | |
| 5,826,703 A * | 10/1998 | Altemus et al. | 198/823 |
| 6,349,819 B1 | 2/2002 | Nohl et al. | |
| 6,550,606 B2 | 4/2003 | Tapp | |
| 6,971,507 B2 * | 12/2005 | Forman | 198/805 |

FOREIGN PATENT DOCUMENTS

JP    61-188314    *    8/1986    ................ 198/842

* cited by examiner

*Primary Examiner*—James R Bidwell
(74) *Attorney, Agent, or Firm*—Richard A. Ryan

(57) ABSTRACT

An improved return roller assembly for use in a continuous belt conveyor system comprises a shaft disposed between a pair of sealed bearing assemblies that are mounted to the underside of a frame member to define the return flight section of the conveyor system so as to support and guide the conveyor belt. The ends of the shaft, which is preferably made out of cold-rolled steel, connect to bearings that are rotatably disposed in the bearing housing. Preferably, the bearing assemblies have a sealed bearing to reduce the likelihood of clogging or other damage from dust, bulk material or other debris that may be present and, therefore, reduce the cost and downtime associated with maintenance and repair.

10 Claims, 1 Drawing Sheet

RETURN ROLLER ASSEMBLY

CROSS-REFERENCE TO RELATED APPLICATIONS

None.

BACKGROUND OF THE INVENTION

A. Field of the Invention

The field of the present invention relates generally to continuous belt systems configured for carrying bulk materials thereon. More particularly, the present invention relates to such continuous belt systems having a plurality of return roller assemblies supporting the conveyor belt during its return fligh. Even more particularly the present invention relates to a return roller assembly having a solid shaft connected to sealed bearings.

B. Background

Continuous belt conveyor systems are commonly utilized to carry bulk materials, including trash, recyclables, gravel, coal, aggregate and many other types of materials, from one location to another, sometimes over long distances. One well known configuration for such conveyor systems has a continuous belt that comprises an upper flight section which carries the bulk materials to a location where it is dumped off the end of the conveyor belt for disposal or further processing and a lower flight section that returns the belt to a position where it can receive more bulk materials. A supporting framework supports roller assemblies, placed at appropriate intervals, over which the generally flexible belt travels in the upper and lower flight sections. To better maintain the bulk materials on the belt when traveling through the upper flight section, it is common to arrange the roller assemblies in the upper flight section in a generally trough or trough-like cross section that defines the belt in a corresponding configuration. These roller assemblies are commonly referred to as trough roller assemblies. The lower flight section is typically supported by roller assemblies comprising a single roller that supports the flexible belt in a generally flat or horizontal configuration. These roller assemblies are commonly referred to as return roller assemblies.

The present invention is directed to an improved return roller assembly for supporting and directing the conveyor belt during its return flight. The prior art return roller assemblies generally comprise an elongated tubular roller having a shaft and bearings, disposed in the roller, that allow the roller to freely rotate with the movement of the belt against surface of the roller. The ends of the shaft extend outwardly from the ends of the roller and attach to brackets that transversely support the roller between a pair of frame members which comprise the framework that supports the continuous belt conveyor system. In a common configuration, as exemplified in U.S. Pat. No. 3,212,626 to McLeish, et al. and U.S. Pat. No. 3,105,588 to Long, a single roller extends the entire length between the brackets to support the belt, which are typically provided in widths of 24, 30, 36 and 48 inches. These return roller assemblies have some well known problems that the present invention overcomes. The primary problem results from the fact that the existing roller assemblies utilize bearings that cannot be greased. Because the rotating ends of the rollers are exposed where they connect to the bearings and brackets, they are known to become clogged with debris, typically from the bulk materials being transferred over the upper flight section. As an example, in recycling operations where the conveying system is utilized to convey waste materials for further processing, it is well known that waste particles can clog the bearings. Problems with other materials are also well known. When the bearings become clogged, they freeze-up and stop rotating. When this happens the belt is then sliding over a stationary roller, which has a relatively thin metal shell that, over time, is gradually ablated away. If not fixed, the roller will form jagged edges that cut into the conveyor belt. Avoiding clogging of the ends of the rollers require frequent maintenance in order to prevent damage to the rollers, belt and the belt system itself. Even with frequent maintenance the rollers typically require frequent replacement. In addition to the direct cost of purchasing new rollers and installing the rollers, clogging of the rollers in the return roller assembly significantly impacts the efficient operation of the belt system and, therefore, the use or processing of the bulk materials.

Another problem that is well known with the single tubular roller for the return roller assembly is that the edges of the belt tend to cut into the roller, which forms holes in the roller that necessitate its replacement before it significantly damages the belt. This problem results from the fact that the troughing rollers which are commonly utilized to support the belt in the upper flight section tend to impart a trough-like cross section to the belt itself. On the return flight, the belt is upside down relative to the upper flight, causing the edges of the belt to cut into the tubular return roller and damage the edges of the belt. U.S. Pat. No. 5,373,935 to Anderson describes a return roller assembly for a bulk conveyor system that attempts to overcome this problem by providing three rollers that are configured in an inverted trough-like shape to match the shape of the belt. The three rollers are separately supported by brackets that attach to a transverse support member. While the assembly of the Anderson patent attempts to address the issue of the belt having a trough-like shape in an attempt to eliminate the belt cutting into the roller, it does not address the issue of the exposed bearings in the roller and the problems associated with clogging. In fact, due to the number of rollers used in that assembly, the likelihood of this problem is likely increased.

What is needed, therefore, is an improved configuration for a return roller assembly that substantially reduces or eliminates debris clogging the rotating mechanism, a problem which is prevalent among presently available return roller assemblies. The preferred return roller assembly should substantially shield the rotating connections from being clogged with debris or other material so as to reduce the need for maintenance and/or replacement of the bearings and rollers. The preferred return roller assembly should comprise a minimum number of moving parts and be adaptable for a variety of different types of belts and conveyor system configurations. Preferably, the improved return roller assembly will be adaptable to being manufactured out of materials and components that provide a lower cost return roller assembly for use in various industrial and commercial enterprises.

SUMMARY OF THE INVENTION

The improved return roller assembly of the present invention solves the problems and provides the benefits identified above. That is to say, the present invention discloses an improved return roller assembly that substantially reduces or eliminates clogging of the rollers and bearings so as to reduce the need for maintenance and replacement, thereby reducing the cost of operating continuous belt conveyor systems and improving their operating efficiency. The return roller assembly of the present invention has a minimum number of moving parts and utilizes materials and components that are generally readily available, providing a relatively cost effect continuous belt conveyor system. In addition, the return roller assembly of the present invention is adaptable to a variety of different belt and/or conveyor system configurations.

In the primary embodiment of the present invention, the return roller assembly comprises an elongated, rod-like shaft having ends that connect to sealed bearing assemblies mounted directly to frame members so as to support and guide a continuous belt in the return flight section of a continuous belt conveyor system. More specifically, the return roller assembly of the present invention comprises an elongated shaft having a first end that rotatably connects to a first bearing assembly and a second end that rotatably connects to a second bearing assembly. In the preferred embodiment, each of the first and second bearing assemblies have a sealed bearing disposed in a housing that is mounted directly to their respective frame member of the frame assembly utilized to support the return flight section of a continuous belt conveyor system.

Accordingly, the primary objective of the present invention is to provide a return roller assembly that provides the advantages discussed above and overcomes the disadvantages and limitations associated with presently available return roller assemblies.

It is also an object of the present invention to provide an improved return roller assembly for a continuous conveyor belt system that supports and guides the flexible conveyor belt in the return flight section of the system.

It is also an object of the present invention to provide an improved return roller assembly for continuous conveyor belt systems that is configured so as to substantially reduce or eliminate debris clogging the rotatable connection of the return roller assembly.

It is also an object of the present invention to provide an improved return roller assembly for continuous conveyor belt systems that overcomes the problems with a trough-like shaped belt cutting into a tubular roller without the use of multiple roller sections.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of a preferred embodiment and represents one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are primarily directed to a return roller assembly utilized in a continuous belt system having the return flight section disposed below the upper, material carrying flight section, those skilled in the art will readily understand that this is shown merely for purposes of simplifying the present disclosure and that the present invention is not so limited.

Figure 1:
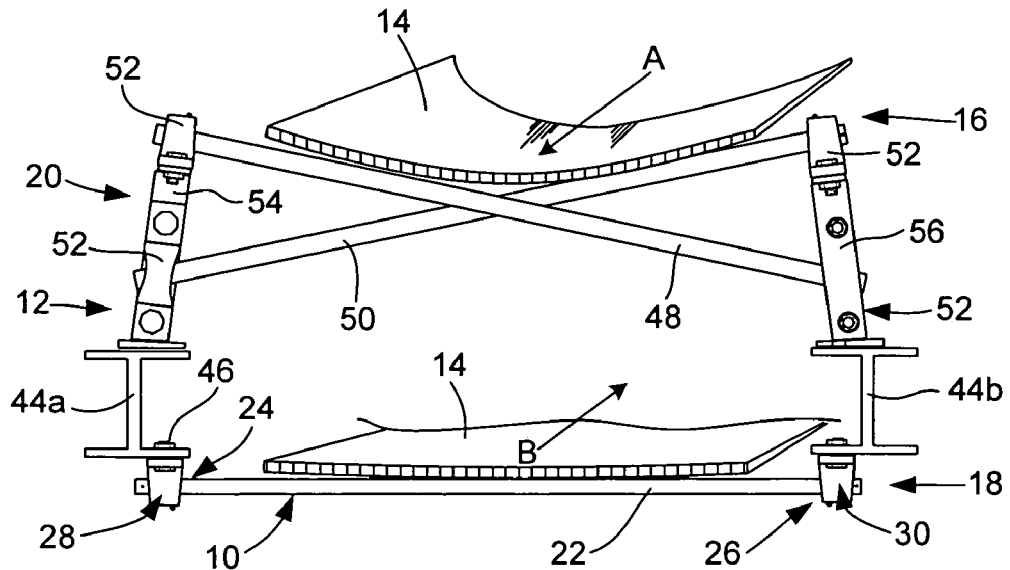
FIG. 1 is fragmentary front perspective view showing a continuous belt conveyor system having a return roller assembly configured according to a preferred embodiment of the present invention.
Figure 2:
FIG. 2 is a front view of the return roller assembly of FIG. 1 shown separate from the continuous belt conveyor system.

A return roller assembly that is manufactured out of the components and configured pursuant to a preferred embodiment of the present invention is shown generally as 10 in FIGS. 1 and 2. Return roller assembly 10 is preferably and beneficially utilized in a continuous belt conveyor system 12 having a continuous belt 14 moving in the direction indicated as A in the upper flight section 16 and moving in the direction indicated as B in the lower or return flight section 18. Upper flight section 16, in which belt 14 is typically formed by the trough roller assembly 20 into a trough or trough-like cross-section, is utilized to carry bulk materials to a place for processing or disposal. Lower flight section 18 is utilized to return the belt 14 for receiving more bulk materials thereon. Return roller assembly 10 is utilized to support belt 14 in a generally flat or horizontal configuration and guide it through the return flight section 18. Although the trough roller assembly 20 shown in use with system 12 of FIG. 1 is a preferred configuration, which is the subject of a copending patent application by the same inventor as the present invention, the use of return roller assembly 10 is not so limited. As will be readily apparent to those skilled in the art of continuous conveyor belt systems, various configurations of trough roller assembly 20 are suitable for use with return roller assembly 10 of the present invention.

Figure 3:
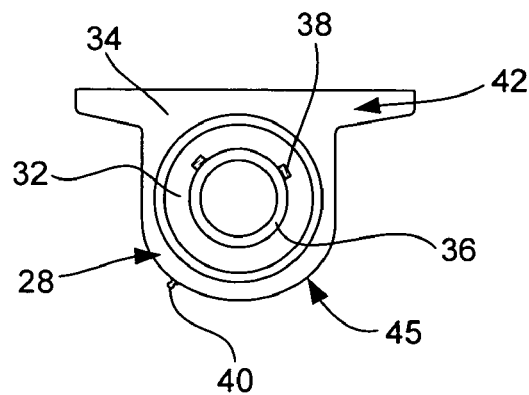
FIG. 3 is a side view of a bearing assembly utilized in the return roller assembly of the present invention of FIG. 1 showing the use of the bearing mount housing and bearing.

In a preferred embodiment, return roller assembly 10 comprises a shaft 22 that is configured as an elongated, substantially linear solid metal rod having a first end 24 and a second end 26, as shown in FIG. 2. Preferably, shaft 22 is made from cold-rolled steel or like material that provides a hardened surface that is smooth at least at and near first 24 and second 26 ends for attachment to first bearing assembly 28 and second bearing assembly 30, respectively. As best shown in FIG. 3, each of the bearing assemblies 28 and 30 have a bearing 32 that is configured to connect to the ends 24 and 26 of shaft 22, as explained in more detail below.

In the preferred embodiment, first 28 and second 30 bearing assemblies are sealed bearing units having bearing 32 rotatably mounted in a cast iron bearing housing 34 that is configured to allow the bearing 32 to slip (i.e., be self-centering) within housing 34 to compensate for any non-linear alignment of shaft 22. The housing 34 shown is commonly referred to as a pedestal or pillow block unit. As well known in the art, sealed bearing units are generally available as an off-the-shelf component, thereby reducing the manufacturing cost of return roller assembly 10 of the present invention. Bearing assemblies 28 and 30 are provided with an insert member 36, shown in FIG. 3, that is configured in a generally tubular configuration to receive either first 24 or second end of shaft 22 therein in a general "slip fit" arrangement. Once an end, such as first end 24 or second end 26, is received in the insert member 36, set screws 38 or other suitable insert connectors are utilized to fixedly interconnect the insert member 36, and therefore the bearing 32, to shaft 22. Allowing for bearing 32 to slip within housing 34 compensates for any original misalignment or misalignment that occurs as a result of shaft deflection so as to reduce the stress on the bearing raceways and balls (which could shorten the life of bearing 32). By being sealed, the likelihood of damage or shortened bearing life from debris, such as crushed glass particles or the like, clogging bearing 32 is significantly reduced or even virtually eliminated. In addition, maintenance to remove any debris from around bearing 32 is also reduced. If desired, first 28 and second 30 bearing assemblies can be of the relubrication type that has a grease hole in the bearing's outer ring (not shown), a circumferential groove in the bore of the housing 34 and a grease fitting, shown as 40 in FIG. 3, on the housing 34 to allow for regressing bearing 32. Housing 34 has a base section 42 with one or more apertures therein (not shown) so the bearing assembly 28 or 30 may be attached to the bottom of frame member 44 with one or more appropriately configured connecting elements, such as the bolts shown as 46 in FIG. 1, in a manner that the bearing section 45 of housing 34 is directed generally downward from below frame member 44. Although housing 34 is shown as being attached directly to frame member 44, those skilled in the art will understand that bearing assemblies 28 and 30 can be incorporated into a bracket or other mounting structure that then attaches to frame member 44.

In the configuration of conveyor system 12 shown in FIG. 1, trough roller assembly 20 attaches to the top side of the frame members 44 to which the first 28 and second 30 bearing assemblies attach at the bottom. In the system 12 of FIG. 1, trough roller assembly comprises a first shaft 48 and a second shaft 50 that connect at their ends to bearing assemblies 52 on first support member 54 and second support member 56. In the configuration shown, first shaft 48 and second shaft 50 are disposed in a generally x-shaped configuration so as to support the belt 14 in the user's desired trough shape (as shown) for upper flight section 16. As will be readily apparent to those skilled in the art, the relative configuration of first shaft 48 and second shaft 50, resulting from the connections to bearing assemblies 52 positioned on first support member 54 and second support member 56, will define the resulting trough shape. The flexible belt 14 will move against the upper sections of first shaft 48 and second shaft 50 to define the trough shape desired to transport bulk materials so as to prevent these materials from readily falling off of the upper flight section 16.

As stated above, in the preferred embodiment shaft 22 is a solid metal member manufactured from cold-rolled steel, thereby avoiding problems known to exist with use of tubular rollers and for a generally lower cost return roller assembly 10. The use of off-the-shelf sealed bearing assemblies 28 and 30 further reduce the cost of return roller assembly 10. In addition, because the bearings 32 are sealed, there is significantly less likelihood of damaging bearings 32 from debris that falls off of belt 14 or which is otherwise in the area (i.e., dust) of continuous belt conveyor system 12. This substantially reduces the cost and downtime required for maintenance of return roller assembly 10 relative to existing assemblies. If it does become necessary to replace a bearing 32, many of the available bearing assemblies are configured to relatively easily remove bearing 32 by popping it off of housing 34, which can be done without shutting down the conveyor system 12. Even it is necessary to replace the entire first 28 or second 30 bearing assembly, the user only has to loosen set screws 38, remove either first 24 or second 26 end of shaft 22 from bearing 32, remove housing 34 from frame member 44 and then reinstall a new bearing assembly in its place, which can be done with little or no downtime of conveyor system 12. In use, the base section 42 of bearing assemblies 28 and 30 is securely attached to the underside of frame member 44, with the use of one or more connecting elements 46 or by welding or the like, with the bearing section 45 directed downwards, as shown in FIG. 1. With insert member 36 in place against bearing 32, the first 24 and second 26 ends of shaft 22 are inserted into insert member 36 and connectors 38 tightened to securely connect insert member 36 to first 24 and second 26 ends of shaft 22. As such, shaft 22 will freely rotate in bearings 32 when belt 14 is passing over shaft 22.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A return roller assembly configured to support a belt in a continuous belt conveyor system, said return roller assembly comprising:
   an elongated shaft having a first end and a second end;
   a first bearing assembly at said first end of said shaft, said first bearing assembly having a housing and a bearing rotatably disposed in said housing, said first end of said shaft connected to said bearing, said bearing and said bearing housing of said first bearing assembly cooperatively configured to allow said bearing to slip so as to be generally self-centering; and
   a second bearing assembly at said second end of said shaft, said second bearing assembly having a housing and a bearing rotatably disposed in said housing, said second end of said shaft connected to said bearing, wherein said shaft rotates between said first bearing assembly and said second bearing assembly upon linear movement of said belt on said shaft, said bearing and said bearing housing of said second bearing assembly cooperatively configured to allow said bearing to slip so as to be generally self-centering.

2. The return roller assembly according to claim 1, wherein said shaft is a solid metal rod.

3. The return roller assembly according to claim 1, wherein each of said first bearing assembly and said second bearing assembly further comprise an insert member engaged with said bearing, said insert member of said first bearing assembly interconnecting said first end of said shaft and said bearing of said first bearing assembly, said insert member of said second bearing assembly interconnecting said second end of said shaft and said bearing of said second bearing assembly.

4. The return roller assembly according to claim 1, wherein said housing of said first bearing assembly is attached to a first frame member and said housing of said second bearing assembly is attached to a second frame member in spaced apart relation to said first bearing assembly.

5. The trough roller assembly according to claim 1, wherein said bearing in said first bearing assembly is sealed and said bearing in said second bearing assembly is sealed.

6. A return roller assembly configured to support a belt in a continuous belt conveyor system, said return roller assembly comprising:

an elongated solid rod-like shaft having a first end and a second end;

a first bearing assembly at said first end of said shaft, said first bearing assembly having a housing and a bearing rotatably disposed in said housing, said first end of said shaft connected to said bearing, said housing attached to a first frame member, said bearing and said bearing housing of said first bearing assembly cooperatively configured to allow said bearing to slip so as to be generally self-centering; and a second bearing assembly at said second end of said shaft, said second bearing assembly having a housing and a bearing rotatably disposed in said housing, said second end of said shaft connected to said bearing, said housing attached to a second frame member in spaced apart relation to said first frame member, wherein said shaft rotates between said first bearing assembly and said second bearing assembly upon linear movement of said belt on said shaft, said bearing and said bearing housing of said second bearing assembly cooperatively configured to allow said bearing to slip so as to be generally self-centering.

7. The return roller assembly according to claim 6, wherein said shaft is manufactured out of cold-rolled steel.

8. The return roller assembly according to claim 6, wherein each of said first bearing assembly and said second bearing assembly further comprise an insert member engaged with said bearing, said insert member of said first bearing assembly interconnecting said first end of said shaft and said bearing of said first bearing assembly, said insert member of said second bearing assembly interconnecting said second end of said shaft and said bearing of said second bearing assembly.

9. The trough roller assembly according to claim 8, wherein said bearing in said first bearing assembly is sealed and said bearing in said second bearing assembly is sealed.

10. The trough roller assembly according to claim 6, wherein said bearing in said first bearing assembly is sealed and said bearing in said second bearing assembly is sealed.

* * * * *